Nov. 15, 1938.  DE FOREST H. SEELEY  2,136,806
BRAKE MECHANISM
Filed Nov. 17, 1937
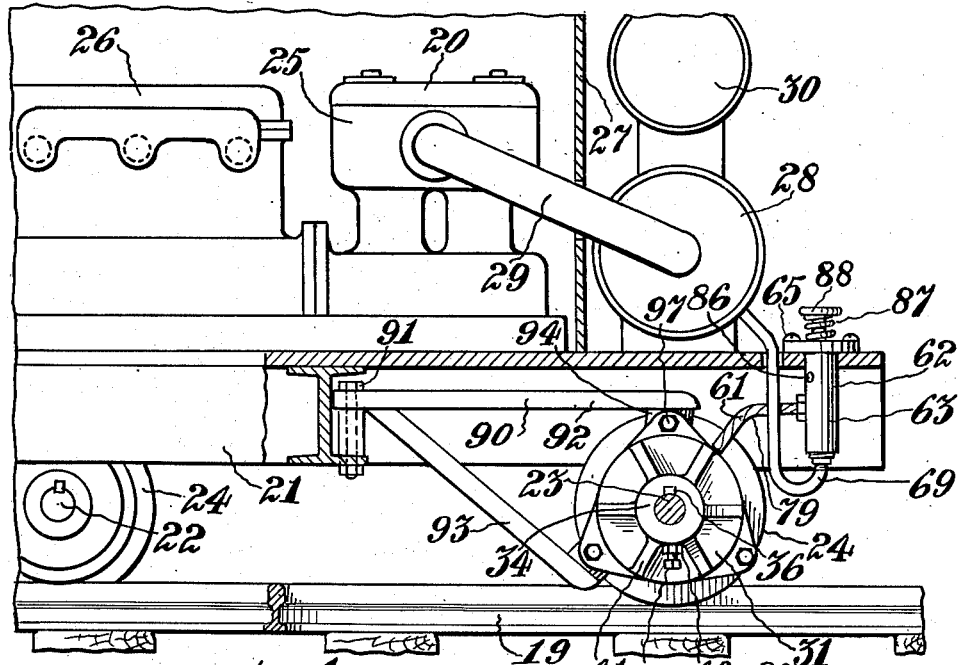
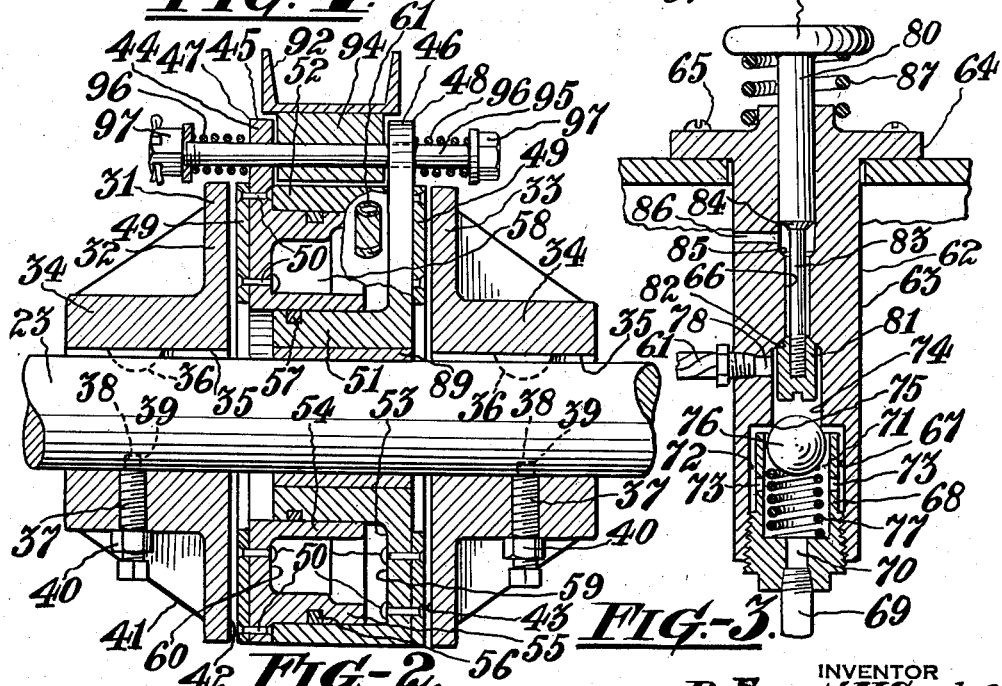
INVENTOR
DeForest H Seeley.
BY
HIS ATTORNEY.

Patented Nov. 15, 1938

2,136,806

UNITED STATES PATENT OFFICE 2,136,806

BRAKE MECHANISM

De Forest H. Seeley, Painted Post, N. Y., assignor to Ingersoll-Rand Company, Jersey City, N. J., a corporation of New Jersey Application November 17, 1937, Serial No. 175,025

2 Claims. (Cl. 188—152)

This invention relates to brake mechanisms, and more particularly to a brake mechanism for a rotary member, as for example an axle of a wheeled mounting for portable compressor outfits.

One object of the invention is to assure a full area of contact between the surfaces relied upon for effecting the braking function.

Another object is to construct a simplified brake mechanism that is quickly responsive to the will of the operator and which may be readily and cheaply maintained in efficient operating condition.

Other objects will be in part obvious and in part pointed out hereinafter.

In the accompanying drawing in which similar reference numerals refer to similar parts, Figure 1 is a side elevation, partly broken away, of a portable compressor outfit equipped with brake mechanism constructed in accordance with the practice of the invention, Figure 2 is a longitudinal sectional elevation of the brake mechanism, and Figure 3 is an elevation, in section, of a control device for the braking mechanism.

Referring more particularly to the drawing, 20 designates a compressor outfit of the portable type comprising a platform 21 mounted upon axles 22 and 23 to which are keyed flanged wheels 24 which rest upon rails 19 of a track for the outfit 20.

On the platform 20 is a compressor 25 and a motor 26 which may be directly connected, in a well known manner, to the compressor for driving it. Suitable transmission mechanism (not shown) may be interposed between the drive shaft of the motor 26 and the axle 22, for impelling the compressor outfit along the rails 19.

The compressor and the motor may be enclosed by a cover 27, and on a portion of the platform 21, outside of the cover 27 in the present instance, is a storage receiver 28 for compressed fluid conveyed thereto from the compressor 25 by a pipe 29. A tank 30 shown arranged above the receiver 28 serves as a fuel storage for the motor 26.

The brake mechanism, constructed in accordance with the practice of the invention and designated in its entirety by 31 is shown associated with the axle 23 and arranged between the wheels 24. It comprises a pair of flanges 32 and 33 which encircle the axle 23 and have trunnions 34 through which the axle 23 extends. In the trunnions are key slots 35 to receive the projecting portions of keys 36 seated in the axle 23. The flanges 33 are thus keyed to the shaft 23 to rotate therewith. In order to prevent longitudinal movement of the flanges 32 and 33 with respect to the axle 23 and assure a correct spacing of the flanges, screws 37 are threaded through the trunnions and have stems 38 that extend into sockets 39, and on the screws 37 are lock nuts 40 to prevent unauthorized unthreading of the screws.

Preferably the flanges 32 and 33 are adequately buttressed by inclined ribs 41 that extend longitudinally of the trunnions 34, and the confronting ends of the flanges 32 and 33 constitute braking surfaces 42 and 43 for cooperation with a braking element 44 interposed between the braking surfaces to retard the movement of the axle 23 or to bring the axle to a state of rest.

The braking element 44 comprises a pair of carriers 45 and 46 having flanges 47 and 48 which respectively confront the flanges 32 and 33 and carry on their outer surfaces friction members 49 to frictionally engage the braking surfaces 42 and 43. The friction members are in the form of disks. They may be of any suitable material and are shown as being secured to the carriers by rivets 50.

On the inner surface or end of the flange 48 are a pair of annular walls 51 and 52 arranged concentrically with respect to each other to define an annular chamber 53 for the reception of similar walls 54 and 55 on the flange 47. The confronting surfaces of the walls 51 and 54 are in slidable engagement with each other, as are also those of the walls 55 and 52 in order to assure a nice sliding fit between the carriers 45 and 46. Preferably, however, a sealing ring or packing member 56 is arranged in the periphery of the wall 55 to effect a seal between the walls 55 and 52 and, for a like reason, a sealing member or ring 57 is arranged in the periphery of the wall 51 to engage the inner surface of the wall 54.

The space between the walls 54 and 55 is in the form of an annular groove 58 which communicates with the chamber 53. The bottoms or ends of the chamber 53 and the groove 58 constitute actuating surfaces 59 and 60, respectively, against which pressure fluid acts for actuating the carriers 45 and 46 toward the braking surfaces 42 and 43. The pressure fluid employed for this purpose is derived from the storage receiver 28 and conveyed to the actuating surfaces 59 and 60 by conduit means 61 connected to the storage receiver and to the wall 52 of the carrier 46.

Interposed in the conduit means 61 is valve mechanism 62 for controlling the flow of pressure fluid to and from the actuating surfaces. The valve mechanism comprises a casing 63 having a flange 64 which seats upon the platform 21 and may be secured thereto by screws 65. The casing 63 is hollow throughout, having a bore 66 comprising an enlarged portion 67 at its lower end to receive a guide member 68 which is threaded into the casing.

The guide member is in the form of a plug to seal the lower end of the bore 66 and has connected thereto a section 69 of the conduit means leading to the storage receiver 28. The section 69 opens into a passage 70, in the end wall of the guide member 68, whereby communication is afforded between the section 69 and a recess 71 in the guide member. Preferably the inner end of the guide member is of smaller diameter than the portion 67 of the bore 66 to provide an annular space or passage 72 around the guide member and into which space pressure fluids may flow from the recess 71 through ports 73 in the guide member.

Adjacent the portion 67 of the bore and opening thereinto is a reduced portion 74 having a seat 75 at its juncture with the portion 67 for a valve 76 which is normally pressed against the seat 75 by a spring 77 in the recess 71. The portion 74 serves to convey pressure fluid from the portion 67, in the open position of the valve 76, to a port 78 in the casing 63 and to which port is connected the section 79 of the conduit means leading to the annular chamber 53.

The means whereby the valve 76 is actuated to the open position is in the form of a plunger 80 which extends slidably through the bore 66 and carries at its lowermost end a valve 81 lying within the portion 75 of the bore and cooperating with a seating surface 82 in the innermost end of the portion 74 to effect a seal at this point. The valve 81 is threadedly connected to a reduced stem 83 of the plunger, and near the juncture of the stem 83 and the main body portion of the plunger is a bevelled surface 84 to cooperate with a similar surface 85 in the bore 66 to prevent the passage of pressure fluid through the portion of the bore containing the stem 83 during the time the parts are in position to admit pressure fluid into the annular chamber 53.

In the casing 62 is a port 86 which opens into the bore 66 above the seating surface 85 and serves as an atmospheric exhaust port through which pressure fluid utilized for actuating the braking element may be exhausted to the atmosphere.

The range of movement of the plunger is such that when the valve 81 is seated upon the surface 82 the bevelled surface 84 will lie above the exhaust port 86 so that the exhaust port will be normally in communication with the portion of the bore 66 lying between the seating surfaces 82 and 85. To the end that the plunger 80 may be held in this position a spring 87 is disposed about the upper end of the plunger to seat against the casing 63 with one end and with its other end against a button 88, carried by the plunger, and against which manual pressure may be applied, as with the foot of the operator, to shift the plunger to the various controlling positions.

As a preferred arrangement, the braking element is mounted upon and supported by the axle 23, and a bearing surface is provided therefor to engage the axle in the form of a bushing 89 inserted in the wall 51 to which it may be affixed as by press-fit, or otherwise.

The braking element which is the non-rotatable element of the brake mechanism is held thus by an arm or brace 90 of V-shape anchored to the platform 21 as by a bolt 91. On the free ends of the arms 92 and 93 of the brace are blocks 94 which lie between the outer portions of the flanges 47 and 48 of the carriers and are pivotally connected to the carriers by bolts 95 lying outside of the peripheries of the flanges 32 and 33. The bolts 95 are of such length that their ends project beyond the ends of the carriers, and on the projecting portions of the bolts are springs 96 which act against heads 97, of the bolts, and against the carriers to normally maintain the friction members 49 out of engagement with the braking surfaces 42 and 43.

In practice, whenever it is desired to apply braking effect to the axle 23 the plunger 80 is depressed to hold the bevelled surface 84 against the seating surface 85 and to unseat the valve 76. Pressure fluid will then flow from the storage receiver through the conduit section 69 into the channels in the casing 63, thence through the conduit section 79 into the annular chamber 53 and, acting against the surfaces 59 and 60, will move the carriers 45 and 46 outwardly and press the friction members into frictional engagement with the braking surfaces 42 and 43.

The degree of force with which the friction members are pressed against the braking surfaces depends, of course, upon the amount of pressure fluid admitted into the annular chamber, and this, as will be readily understood, may be varied according to need by varying the duration of the charging period of the chamber 53. After the required amount of pressure fluid has been admitted into the annular chamber the plunger 80 is released and the spring 87 then shifts it into a position in which the valve 81 seats against the surface 82 to prevent the escape of pressure fluid to the exhaust port 86.

When it again becomes necessary to relieve the pressure in the braking element the plunger 80 is depressed somewhat to move it into a position in which both the valve 81 and the bevelled surface 84 are out of engagement with their respective seating surfaces. In this way an open channel is established between the conduit section 79 and the exhaust port 86 so that the pressure fluid in the annular chamber 53 may be exhausted to the atmosphere. The springs 96 will then move the carriers 45 and 46 toward the blocks 94 and hold them there to maintain the friction members 49 out of contact with the braking surfaces 42 and 43.

I claim:

1. Brake mechanism, comprising a rotary member having a pair of braking surfaces, a pair of carriers between the braking surfaces, extensions on the carriers in telescopic engagement with each other to define a pressure chamber, friction members on the carriers to engage the braking surfaces, means for controlling the flow of pressure fluid into and from the pressure chamber, stop means for the carriers, means extending through the carriers and the stop means to hold the carriers against rotary movement, and springs on the last mentioned means acting against the carriers to normally maintain the friction members out of engagement with the braking surfaces.

2. Brake mechanism, comprising a rotary member having a pair of braking surfaces, a pair of carriers between the braking surfaces, extensions on the carriers in telescopic engagement with each other to define a pressure chamber, friction members on the carriers to engage the braking surfaces, means for controlling the flow of pressure fluid into and from the pressure chamber, stop means between the outer portions of the carriers, bolts lying outside of the peripheries of the braking surfaces and extending through the carriers and the stop means to hold the carriers against rotary movement, and springs on the bolts acting against the carriers to normally maintain the friction members out of engagement with the braking surfaces.

DE FOREST H. SEELEY.